United States Patent
Benton et al.

(10) Patent No.: US 7,234,710 B2
(45) Date of Patent: Jun. 26, 2007

(54) SPRING POWERED VEHICLE

(76) Inventors: Nick C. Benton, 1035 SW. Sunset Dr., Corvallis, OR (US) 97333; Michael L. Gray, 3365 Crocker La., Albany, OR (US) 97321

(*) Notice: Subject to any disclaimer, the term of this patent is extended or adjusted under 35 U.S.C. 154(b) by 367 days.

(21) Appl. No.: 10/965,119

(22) Filed: Oct. 14, 2004

(65) Prior Publication Data

US 2005/0104311 A1    May 19, 2005

Related U.S. Application Data

(63) Continuation-in-part of application No. 10/269,443, filed on Oct. 11, 2002, now Pat. No. 6,820,880.

(60) Provisional application No. 60/383,079, filed on May 24, 2002.

(51) Int. Cl.
*B62B 1/00* (2006.01)

(52) U.S. Cl. ............... 280/47.31; 298/3; 185/40 H; 185/39; 180/212

(58) Field of Classification Search ............ 280/47.31, 280/47.131, 47.17, 47.24, 47.26, 47.33, 47.3, 280/652, 653, 654, 659, 47.12, 47.32; 180/19.1, 180/19.2, 212; 298/2, 3; 185/40 R, 40 H, 185/9, 10, 37, 39
See application file for complete search history.

(56) References Cited

U.S. PATENT DOCUMENTS

| 76,814 A | 4/1868 | Rhodes |
|---|---|---|
| 92,306 A | 7/1869 | Harea |
| 337,975 A | 3/1886 | Morgan |
| 385,881 A | 7/1888 | Sinkler |
| 424,903 A | 4/1890 | Rogers |
| 1,887,427 A | 11/1932 | Porcello |
| 2,262,903 A | 11/1941 | Peterson |
| 2,710,674 A | 6/1955 | Duncan |
| 2,716,031 A | 8/1955 | Roessler |
| 2,965,393 A | 12/1960 | Cauchon |
| 3,125,997 A | 3/1964 | Corley |
| 6,286,631 B1 | 9/2001 | Kimble |
| 6,390,213 B1 | 5/2002 | Bleicher |
| 6,820,880 B2 * | 11/2004 | Benton et al. ........... 280/47.31 |
| 6,979,043 B2 * | 12/2005 | Leischner et al. ............ 296/98 |

* cited by examiner

*Primary Examiner*—J. Allen Shriver
(74) *Attorney, Agent, or Firm*—James F. Harvey, III; Doerner, Saunders, Daniel & Anderson LLP

(57) ABSTRACT

The present invention provides a manually powered drive assembly for a vehicle. A foot crank winds a helical torsion spring through a system of shafts and sprockets in a first direction. By releasing a brake applied to a wheel, or wheels, of the vehicle, the wound spring transfers a rotational movement from a spring shaft to a freewheel sprocket coaxially aligned with the axle supporting a wheel, so that the rotational movement upon the wheel assists a user in manually moving the vehicle. The drive assembly may be advantageously used with a wheelbarrow to assist in building up momentum for moving heavy loads.

20 Claims, 9 Drawing Sheets

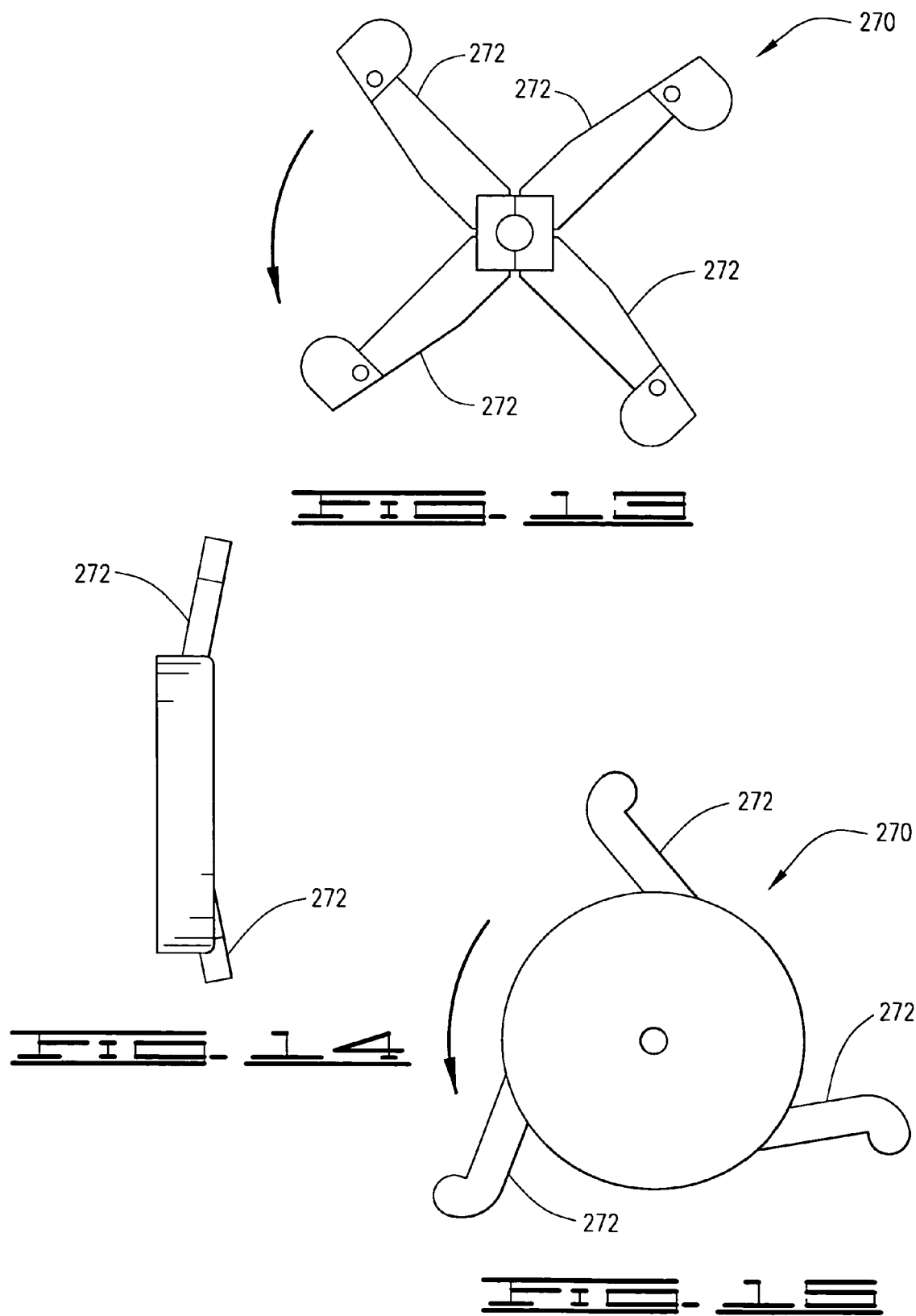

SPRING POWERED VEHICLE

CROSS-REFERENCES TO RELATED APPLICATIONS

This application is a continuation-in-part of U.S. patent application Ser. No. 10/269,443, filed Oct. 11, 2002 now U.S. Pat. No. 6,820,880, which claims priority to U.S. Prov. Pat. Appl. No. 60/383,079, filed May 24, 2002, both incorporated by reference herein.

BACKGROUND OF THE INVENTION

The present invention relates to the field of small wheeled vehicles, and more specifically, it is directed to a drive assembly for a manually propelled wheelbarrow, driven without the use of a motor or electric power.

Laborers in a variety of industries frequently use wheelbarrows and carts to manually move heavy or awkward loads about a work site. For example, in commercial settings construction workers may use wheelbarrows to transport supplies, waste debris, mixed concrete, and other materials as needed from point to point. In private settings, landscapers and gardeners may use wheelbarrows to aid in transporting rocks, soil and potting material, and other tools from a supply location to a work site.

The wheelbarrow has been known in one form or another since early civilization. It generally consists of a carrying enclosure such as a tub or box supported by two parallel handles, the handles being supported by the axis of a wheel serving as a fulcrum on one end and being lifted and pushed by a person holding the opposing end. The single wheel allows the load in the tub to be pushed and easily maneuvered along the ground around challenging obstacles. The size of the load carried in this manner is limited by the ability of the person pushing the wheelbarrow to vertically lift the load mass and then to apply horizontal force to cause the wheelbarrow to roll about its wheel axis along the ground. The horizontal force required to move the loaded wheelbarrow can be increased by obstacles on the ground that impede the rolling action of the wheel (such as rocks, ridges, uneven ground, tools, etc.) or grades. Engines and motors have sometimes been added to the wheelbarrow structure to assist the wheelbarrow user in moving the wheelbarrow horizontally over these obstacles and grades by applying an additional, cooperative driving force to the wheels.

Other wheeled vehicles that are manually powered utilize the same basic principles as wheelbarrows. Such items as garden carts, trash disposal containers, and wagons all employ manual effort for moving the vehicle and may have more than one wheel. For example, U.S. Pat. No. 424,903, issued to Rogers, teaches a spring powered drive apparatus for a three-wheeled vehicle that utilizes a diamond-shaped spring compressed by use of a hand lever. U.S. Pat. No. 6,390,213, issued to Bleicher, discloses a self-propelled cart powered by motors that power independent drive wheels so that each wheel thus equipped with its own motor assists the user in moving the cart over rough or uneven surfaces. The motors are powered by electrical means such as batteries. U.S. Pat. No. 2,2918,133, issued to Ericsson, discloses a barrow or cart also propelled by a gasoline-powered engine driving a single front axle having dual wheels.

Such modifications as adding engines and motors to the basic manual vehicle configuration greatly assist the user in moving heavy loads. However, there are a number of drawbacks to such arrangements. First, motors and engines are generally more expensive than the vehicle structure itself. Second, engines and motors are heavy and bulky and contribute to the weight of the combined vehicle structure and load. Third, the use of the engine or motor imposes a requirement to have a readily available source of fuel. In the case of an engine, gasoline or some other such volatile liquid must be provided; in the case of a motor, the battery must be recharged when it is depleted. In either case, the fuel source must accompany the vehicle or cart when using the apparatus in a remote area. Fourth, use of engines and motors increases the complexity of the apparatus. Engines in particular must be maintained and serviced at periodic intervals. Fifth, an engine is frequently noisy and creates air pollution from the exhaust fumes.

Thus, it can be seen that there is a need for a manual propulsion apparatus to assist the user in moving heavy loads around obstacles and up steep grades, the apparatus being inexpensive, simple to maintain, lighter than standard motors and engines, quiet, non-polluting, and requiring a readily available or renewable source of fuel. It can also be seen that such technology should be available to retrofit existing vehicles to reduce the cost of redundantly purchasing a new vehicle having the technology built-in to the vehicle.

SUMMARY OF THE INVENTION

The present invention achieves its intended purposes, objects, and advantages through a new, useful, and unobvious combination of component elements, with the use of a minimum number of functioning parts, at a reasonable cost to manufacture, and by employing only readily available materials. In these respects, the present version of the invention substantially departs from the conventional concepts and designs of the prior art, and in so doing provides an apparatus that substantially fulfills this need. Additionally, the prior patents and commercial techniques do not suggest the present inventive combination of component elements arranged and configured as disclosed herein.

In one aspect of the invention, a spring powered drive apparatus is provided for a vehicle having at least one wheel. The apparatus is comprised of a drive assembly and a braking assembly. The drive assembly is further comprised of a drive spring for storing and releasing rotational force, crank for manually applying manual rotational force to the drive spring, a first power transmission means to transmit the rotational force applied to the crank to the drive spring for storage of rotational energy, and a second power transmission means to transmit the stored rotational force to a wheel of the vehicle. The braking assembly allows an operator selectively to prevent movement of the wheel or to allow the wheel to rotate freely under the urging of the second power transmission means.

In another aspect of the invention, a manually powered vehicle is provided for a vehicle with at least one wheel rotating on an axle. The vehicle has a drive assembly comprising an drive spring supported on a spring shaft by a fixed hub at a first end of the drive spring and a movable hub at a second end of the drive spring, with the fixed hub arranged to restrain rotational movement of the drive spring and the movable hub arranged to allow rotational movement of the drive spring. A manually powered crank is provided along with a first drive means disposed to communicate rotational force provided by movement of the crank to the movable hub in a direction that winds the drive spring and a second drive means disposed to communicate the stored rotational force exerted by the drive spring on the movable hub to the wheel. A braking assembly is also provided for selectively preventing rotational movement of the wheel and allowing the wheel to rotate freely.

In another aspect of the invention, the present invention provides a wheelbarrow with a manually powered drive assembly, the wheelbarrow comprising a load bearing container, a frame with rails supporting the container at a distance from a horizontal surface, rails positioned intermediate the front and back ends and a transversely mounted wheel positioned at the front end. The drive assembly features a drive assembly frame affixed to the underside of the load bearing container, the frame transversely and fixedly supporting a spring shaft. A drive spring is transversely mounted over the spring shaft, the drive spring positioned under the load bearing container. A drive shaft supports a crank sprocket, transversely supported by and rotating within the drive assembly frame. The drive shaft is manually rotated by foot crank located on the right end of the drive shaft, as viewed from the handle area of the apparatus. The crank sprocket is connected by a first power transmission means to a spring sprocket on the spring shaft. The spring shaft rotates the drive spring, extending or elongating the drive spring against a spring hub, the spring hub guided along spring keepers. The drive spring has a first end constrained from rotational movement and a second end rigidly connected to a rotating hub axially supported by the spring shaft. Thus, an incremented turn of the pedal extends the drive spring so that the drive spring unwinds from its natural position and builds potential energy. Elongate handles are engaged to elevate the rails of the frame at a distance from a horizontal surface. The elongate handles span a back end of the apparatus to a front end of the apparatus substantially under the container. A handle has a hand brake comprising a vertically oriented lever, a brake rod passing below the container and above the frame, and a brake shoe connected to the brake rod so that the plate rubs upon a front wheel and frictionally holds the apparatus in a dormant state. The apparatus moves upon release of a locking pin on the hand brake, disengaging the friction plate from the front wheel. As the locking pin is released, the drive spring returns to its original position, rotating the spring shaft and the spring sprocket in an opposite direction, turning a second power transmission means connected to the freewheel sprocket at the front of the apparatus by a drive chain. The freewheel sprocket rotates a wheel shaft, which turns the wheel so that forward motion of the apparatus is accomplished.

These and other features, aspects and advantages of the present invention will become better understood with reference to the following drawings, description and claims. For a better understanding of the invention, its operating advantages and the specific objects attained by its uses, reference should be made to the accompanying drawings and descriptive matter in which there are illustrated preferred embodiments of the invention. The foregoing has outlined some of the more pertinent objects of the invention. These objects should be construed to be merely illustrative of some of the more prominent feature and applications of the present invention. Many other beneficial results can be attained by applying the disclosed invention in a different manner or by modifying the invention within the scope of the disclosure. Accordingly, other objects and a fuller understanding of the invention and the detailed description of the preferred embodiments in addition to the scope of the invention illustrated by the accompanying drawings.

BRIEF DESCRIPTION OF THE DRAWINGS

FIG. 13 is a view of a four pronged crank, according to an embodiment of the invention;

FIG. 14 is a side view of a crank with a protective hub and showing the angled aspect of the prongs, according to an embodiment of the invention; and FIG. 15 is a view of a three pronged crank with the protective hub, according to an embodiment of the invention.

DETAILED DESCRIPTION OF THE INVENTION

The following detailed description shows the best currently contemplated modes of carrying out the invention. The description is not to be taken in a limiting sense, but is made for the purpose of illustrating the general principles of the invention and the best mode for practicing the invention, since the scope of the invention is best defined by the appended claims.

The invention provides a manually operated, spring-powered drive apparatus for use with a wheeled vehicle to assist the operator of the vehicle in overcoming the inertia of the vehicle when the vehicle is heavily loaded. The drive apparatus may be manually operable by the operator using his hand or foot, so that heavy engines or batteries and motors are not required to provide motive power. Further-more, the drive apparatus does not require an external fuel supply, which makes its use advantageous in areas where fuel is unavailable or difficult to obtain. It is simple, light, and easily maintainable by an operator having minimal mechanical skills. It is believed that the prior art does not teach or suggest the invention either taken alone or in combination with other prior art.

Figure 1:
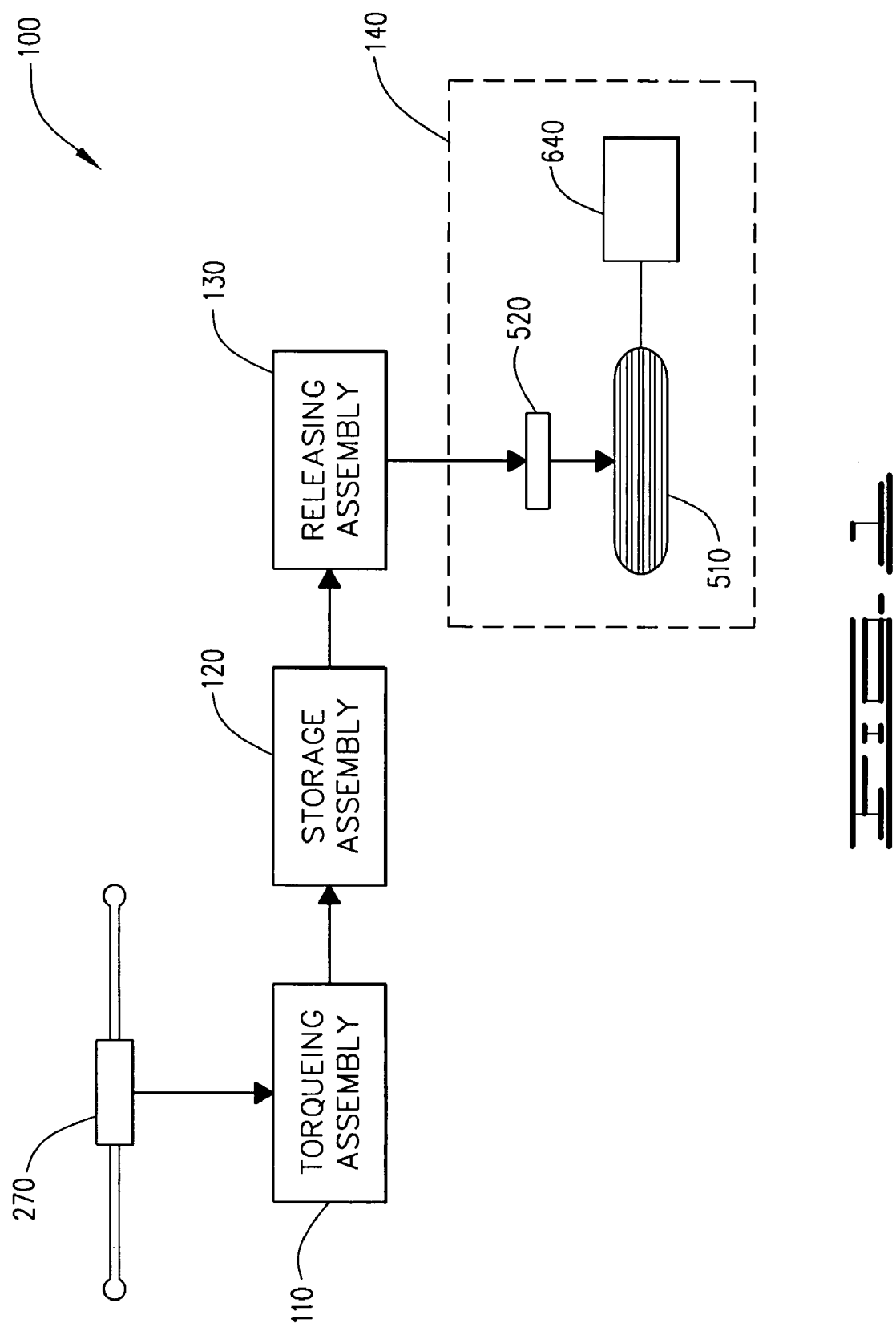
FIG. 1 is a schematic diagram of the generic components comprising the inventive apparatus.

Generally, the components comprising the inventive concept may be shown in the block diagram of FIG. 1. According to the diagram, the drive apparatus 100 has a storage assembly 120 that employs as its main component a helical torsion spring; the spring is formed by winding a rod of steel around the surface of a cylinder at a constant angle, the cylinder having a central longitudinal axis corresponding to a central axis of the spring. Such a spring stores rotational energy when torque is applied to its free end, while the other end is held fixed against the torque. The spring will release its stored energy by allowing the free end to apply in the opposite direction the torque provided by the stored rotational energy. Springs of this type are typically used for such applications as garage door openers. A torquing assembly 110 is used to apply torque to the free end of the spring while a releasing assembly 130 sends the force resulting from the torque in the spring to a motive assembly 140 for moving the vehicle connected to the drive apparatus 110. The motive assembly 140 in the inventive concept may be a wheel 510 connected to a freewheel sprocket 520 and a braking assembly 640 for controlling rotational motion of the wheel 510.

Figure 2:
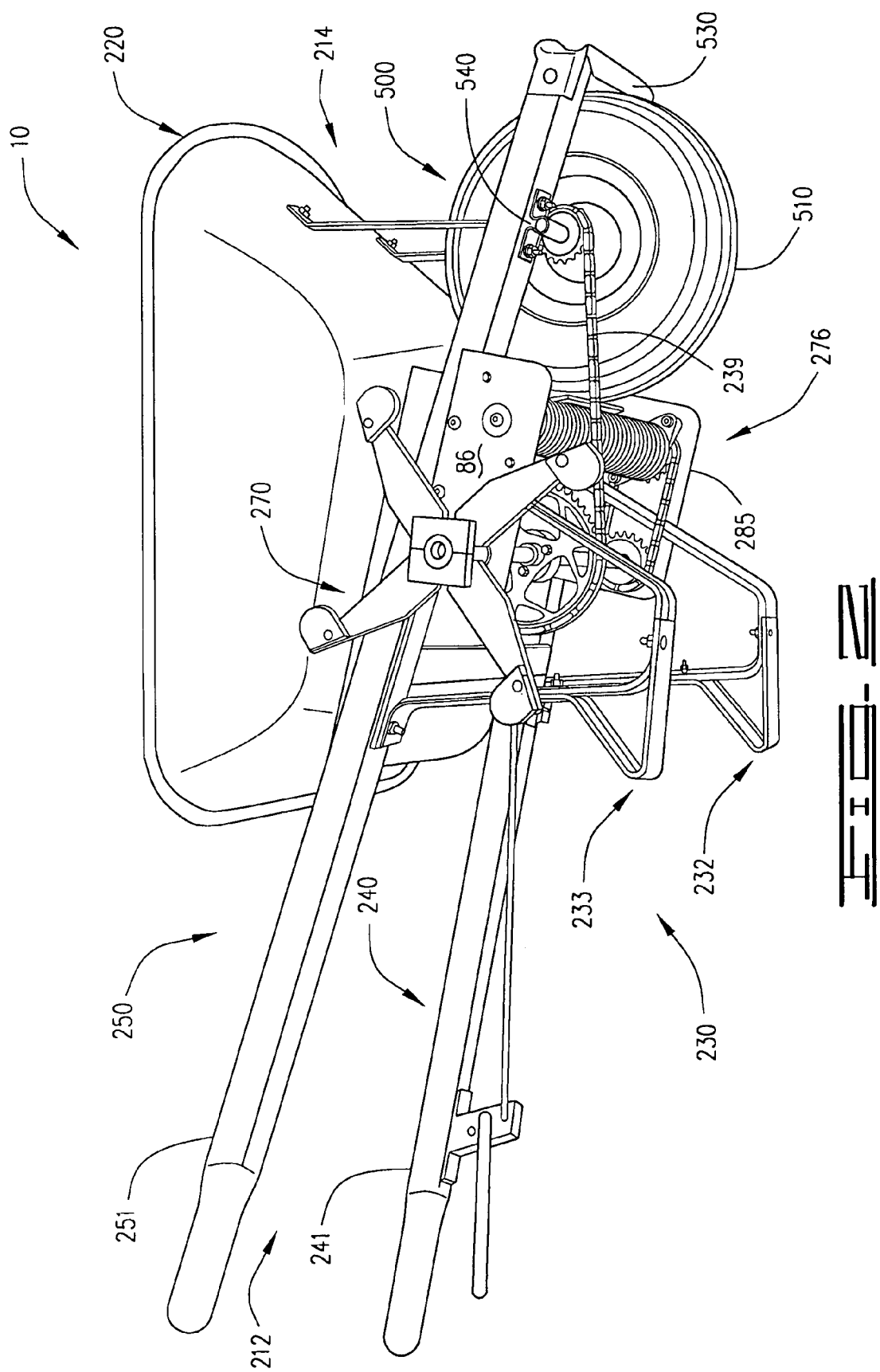
FIG. 2 is a lower elevation of the underside of a wheelbarrow to which the inventive apparatus is attached, according to an embodiment of the invention.

Referring initially to FIG. 2, an embodiment 200 of the invention is shown as applied to a wheelbarrow of standard design known to those skilled in the art. The wheelbarrow having the inventive drive apparatus is shown in FIG. 2 as viewed from its right side; it is shown as comprising a load bearing container 220, frame 230, wheel 510, and supports consisting of right support 232 and left support 233. Load bearing container 220 may be constructed of high density plastic, steel, or any other material that has the capacity and durability to carry heavy or awkwardly displaced loads. Frame 230 is shown as being comprised of a right elongate member 250 and a left elongate member 240. To the underside of each member 240, 250 are attached left support 232 and right support 233, respectively, which maintain the frame 230 in spaced relationship with a horizontal surface, typically the ground, and which carry the load presented by the load bearing container 220 when it is resting on the horizontal surface. The ends of members 240, 250 opposite the handles 241, 251 support an axle 540 of a wheel 510, so that the wheel 510 is maintained in rolling relation with the horizontal surface, thereby providing a stable, three point supporting structure for the load bearing container 220 and its contents. The ends supporting axle 540 are rigidly held together by bracket 530. Embodiments of the inventive drive assembly, examples of which will be presently described, may be attached to the underside of frame 230 between the load bearing container 220 and the horizontal surface. The drive assembly 276 may communicate its rotational force to wheel 510 by a power transmission means, such as chain 239.

Chain 239 is shown as a standard roller chain, commonly used in the art as a bicycle chain, for the transmission of mechanical power. A roller chain is typically made up two inner sides, two outer sides, two pins, two sleeves, and two rollers. The use of rollers reduces friction, resulting in less wear on both the chain and the sprocket than is the case with simpler types. The bicycle chain in general use on all bicycles today is a roller chain with a ½" pitch and either a ⅛" or 3/32" width, the latter being prevalent on derailleur-equipped road, racing, and touring bicycles. Other means of transmission of mechanical power from one sprocket to another may be used in place chain 239 without departing from the scope of the invention, such as, by way of example and not limitation, a rubber belt, a pulley and cable arrangement, or a gear arrangement.

The drive assembly is a device for storing manual energy provided by the efforts of an operator and making that energy available to assist movement of the vehicle over the horizontal surface. This may be accomplished by communicating that energy to the wheel 510 to urge it into clockwise movement (with relationship to the right side depicted in FIG. 2) through a power transmission means. Chain 239 comprises the power transmission means in the embodiment shown. Conditioning drive assembly 276, 400 for operation may consist of a two step process, where the operator first causes a drive spring to be loaded by a winding, or torquing, means, thus storing the winding force as spring energy, and then secondly allowing that spring energy to assist the rotation of wheel 510. Although the winding means may be driven by pneumatic or gasoline powered engine, the embodiment shows the winding means being driven by a foot-powered crank. In this way, a simple arrangement may be provided for accumulation of motive energy, thus avoiding complicated pneumatic arrangements that might employ gas tanks and hoses or engine powered arrangements that might employ noisy, pollution prone engines; also, the embodiment shown avoids the necessity of having an external fuel supply available for powering pneumatic or engine arrangements, the drive assembly 276, 400 relying instead on readily available muscle power.

Figure 3:
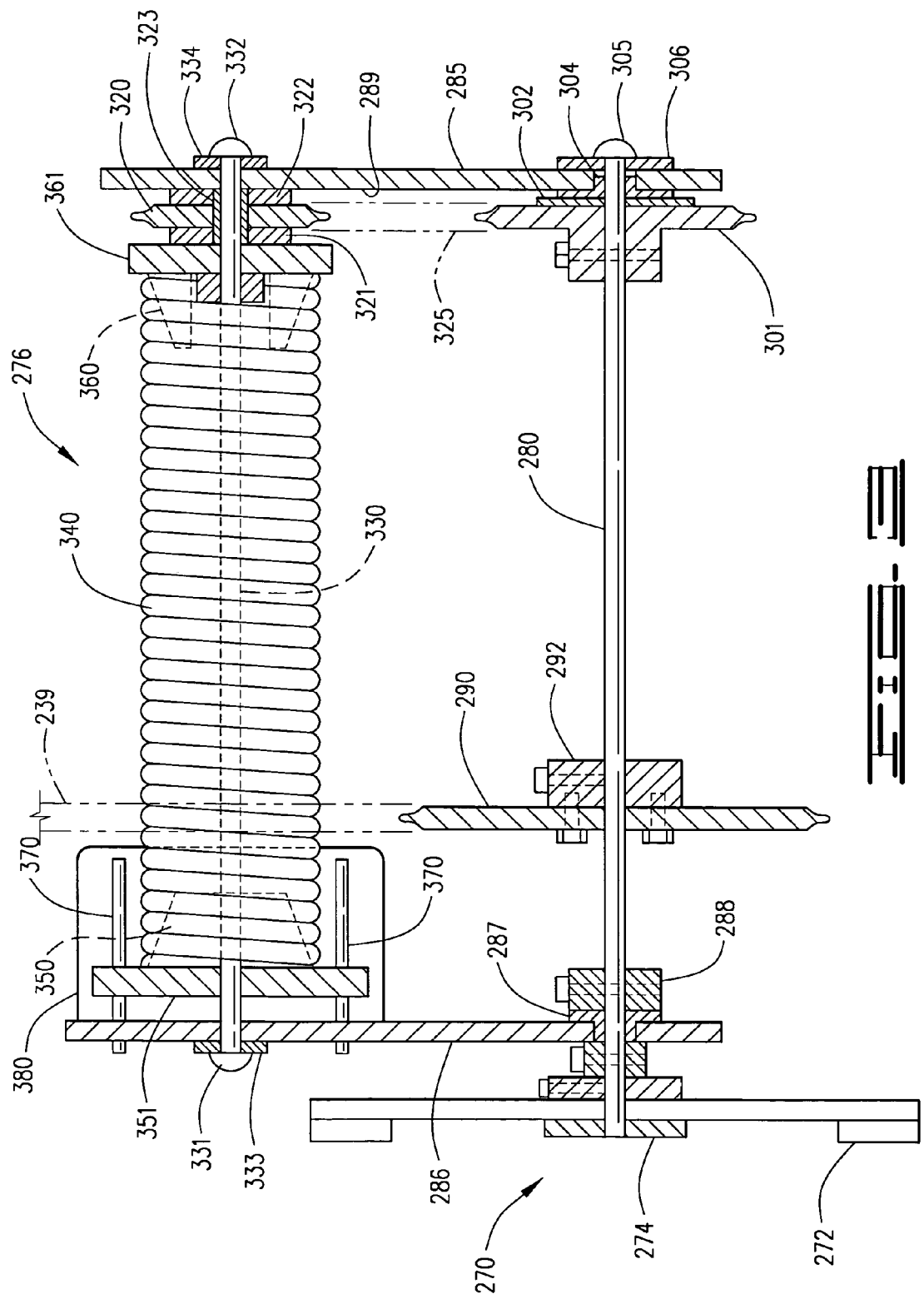
FIG. 3 is a cross-sectional drawing of an embodiment of a drive assembly, according to an embodiment of the invention.

Referring to FIG. 3, an embodiment 276 of the drive assembly is shown, as viewed along the plane formed by its two shafts, drive shaft 280 and spring shaft 330, and viewing the apparatus from its underside. The shafts 280, 330 may be transversely supported by left frame plate 285 and right frame plate 286, each of which are vertically oriented and rigidly attached by any convenient means to the underside of the frame 230 (FIG. 2).

Drive shaft 280 protrudes from insertion through a hole in frame plate 286 where it supports a crank 270 attached thereto, crank 270 held in rigid connection with drive shaft 280 by a collar 274. Crank 270 may be positioned to be easily engaged by the foot of an operator oriented slightly to the right side of the apparatus and to the rear 212, for rotational movement thereof through action of the operator's leg and foot. The operator may step downwardly upon a prong 272, thus imparting torque to the crank 270 along with drive shaft 280 in a counterclockwise direction. Sufficient prongs 272 may be provided for crank 270 to easily turn the crank 270 with a foot without undue hardship. Drive shaft 280 is journalled through right frame plate 286, where it may be supported for rotational movement within the frame plate by a bushing 287 and secured by a collar 288, which allows drive shaft 280 to rotate without sliding axially through plate 285.

It should be noted that, although a four prong crank 270 is shown in FIG. 2, crank 270 may have any reasonable number of prongs without departing from the scope of the invention. FIG. 13 shows an embodiment with four prongs 272 and FIG. 15 shows a similar embodiment with three prongs 272. Also other attachments may be made to the crank 270 to improve its usability. For example, FIGS. 13, 14, and 15 show a three prong crank 270 with a protective hub attached to the distal end of the drive shaft 280 upon which the crank 270 is attached; such a protective hub may be used to prevent a user's pants legs from becoming entangled in the mechanism of the invention.

Drive sprocket 290 may be mounted intermediate the ends of drive shaft 280 and held thereto by a locking collar 292 which may be laterally screwed into and secured to drive sprocket 290 and then rigidly secured to drive shaft 280 with a bolt through the shaft (not shown) so that it rotates along with drive shaft 280. Chain 239 may be mounted and engaged about drive sprocket 290 for transmitting rotational movement of drive sprocket 290 to wheel 510, as will be presently seen. The opposite end of drive shaft 280 from the crank 270 may be journalled through left end plate 285 by means of a bushing 304. It may be held for rotational movement through left end plate 285 by securing washer 306 by bolt 305 to the end of drive shaft 280. A crank sprocket 301 may be secured to the drive shaft 280 adjacent to the interior surface 289 of left frame plate 285 and maintained at a distance therefrom by spacer 302. A second power transmission means communicates rotational force exerted by crank sprocket 301 to drive spring sprocket 320. In the embodiment shown, a chain 325 is shown as a standard roller chain that is mounted upon and engages the teeth in crank sprocket 301. Spacer 302 prevents chain 325 from contact with the interior surface 289 of left frame plate 285.

Spring shaft 330 may be mounted in a fixed arrangement to the frame plates 285, 286 and held in place on either end by a bolts 331, 332 inserted through washers 333, 334, respectively. Spring sprocket 320 positioned on spring shaft 330 in close proximity with frame plate 285 and spaced a distance from frame plate 285 by spacer 322 so that chain 325 does not come into contact with frame plate 285. Chain 325 closely encircles both spring sprocket 320 and crank sprocket 301. Spacers 321, 322 are positioned on either side of spring sprocket 320 so that spring sprocket 320 may be maintained in alignment with crank sprocket 301 and chain 325 may be positioned in a plane substantially parallel with frame plate 285. Bushing 323 may be axially inserted through spacer 322, spring sprocket 320, and spacer 321 so that they may rotate freely about spring shaft 330.

Drive spring 340 is provided for storage and release of rotational force. Although many different types of springs may be employed for use as drive spring 340, the type used in the present embodiment may be a helical torsion spring formed by winding a rod of steel around the surface of a cylinder at a constant angle, the cylinder having a central longitudinal axis corresponding to a central axis of the drive spring 340. Such a spring stores rotational energy as torque is applied to a free end while the other end is held fixed and releases energy by allowing the free end to apply in the opposite direction the torque provided by the stored rotational energy. Springs of this type are typically used for such applications as garage door openers. The central axis of drive spring 340 may be coaxialy aligned with spring shaft 330 which may be inserted therethrough. Each end of drive spring 340 may be frictionally engaged to tapered hubs 350, 360 so as to prevent each end of the drive spring 340 from rotating about its respective tapered hub 350, 360. The base 351 of hub 350 may have holes on either side through which L-shaped rails 370 are inserted. One end of each L-shaped rail 370 may be inserted through a hole in frame plate 286 and the other end may be welded or similarly affixed to a rail platform 380 which may be affixed to and may extend perpendicularly from frame plate 286. The L-shaped rails 370 allow for changes in length of the drive spring 340 as it is tightened and released by permitting base 351 attached to one end of the drive spring 340 to move longitudinally along L-shaped rails 370 without permitting base 351 to rotate about spring shaft 330. Base 351 thus provides a stable platform against which drive spring 340 may be tightened radially while permitting the drive spring 340 to change length longitudinally. The opposite end of drive spring 340 may be wound by rotational action of hub 360 about spring shaft 330. This may be accomplished by affixing spring sprocket 320 to the base 361 of hub 360 by standard means known to those skilled in the art, such as bolts, screws, welding, etc. In this manner, a counterclockwise rotational action about spring shaft 330 (as observed from the right side of apparatus 10) urged by chain 325 about spring sprocket 320 may be transferred to hub 360, resulting in a winding action upon drive spring 340. Similarly, an unwinding action of drive spring 340 results in a clockwise rotational movement of hub 360, resulting in a corresponding clockwise rotational movement of spring sprocket 320.

Figure 6:
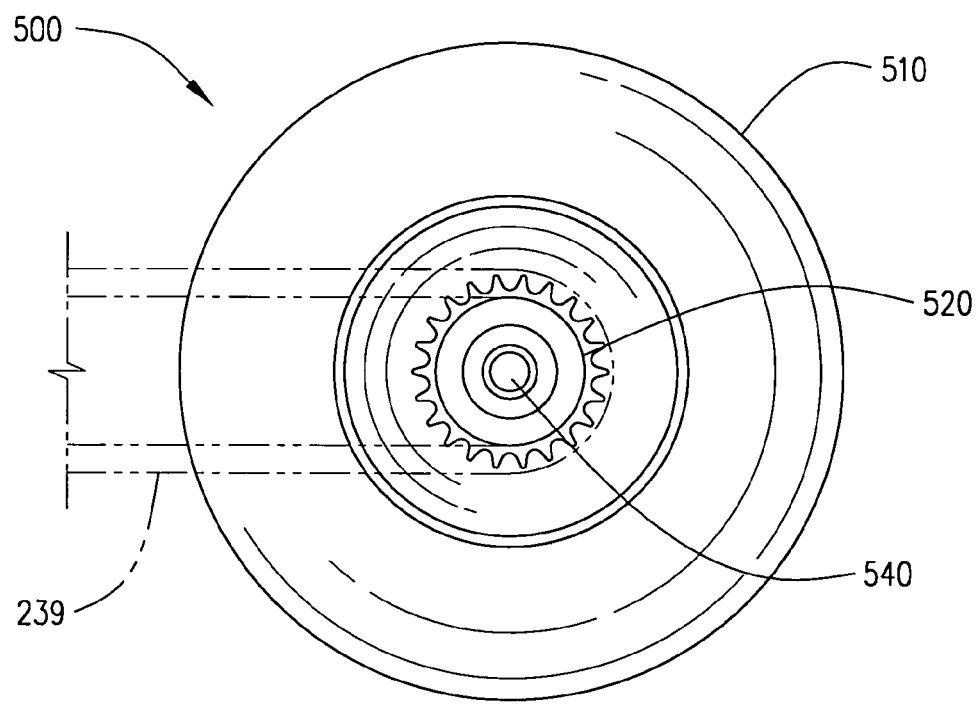
FIG. 6 is a detailed view of the front wheel taken from the right side of the wheelbarrow showing the sprocket and chain arrangement, according to an embodiment of the invention.
Figure 7:
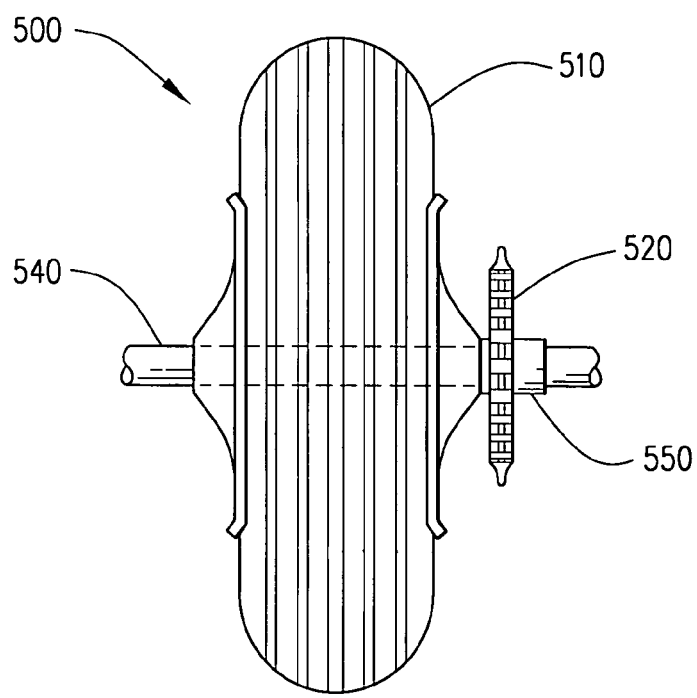
FIG. 7 is a detailed view of the front wheel as viewed from the handle area of the wheelbarrow showing the manner in which the sprocket is attached to the hub, according to an embodiment of the invention.

Power from the drive spring 340 may be transferred by drive chain 239 to the wheel assembly 500 located at the front end 214 of the apparatus 10 (FIGS. 6 and 7). Wheel 510 rotates about an axle 540 which has been inserted through a hub extension 550 for receiving a freewheel sprocket 520 tightened thereto. The hub extension 550 may be attached to the hub of the wheel 510 either permanently as, for example, by welding, braising, and the like, or removably by standard means well known in the art, such as by threading the hub extension 550 with clockwise threads, bolts, screws, set screws, and the like. The drive chain 239 may be inserted about the freewheel sprocket 520 so that when the freewheel sprocket 520 is urged into clockwise rotational movement, the power exerted by the drive chain 239 may be transferred by the freewheel sprocket 520 to the wheel 510 for forward motion of the apparatus 10. However, when the motion of drive chain 239 is reversed so that freewheel sprocket 520 is urged into counterclockwise rotation, the freewheel sprocket 520 rotates freely about its axis about axle 540. In a similar manner, if drive chain 239 is immobile and the apparatus 10 is moved in a backwards direction towards its rear end 212 so that wheel 510 rotates in a counterclockwise direction, then the freewheel sprocket 520 locks, which causes drive shaft 280 to wind the drive spring in a counterclockwise motion as if crank 270 were being used to wind the drive spring 340. In other words, backing the wheelbarrow results in a winding action for drive spring 340 and may have the same effect as winding drive spring 340 with crank 270.

Figure 4:
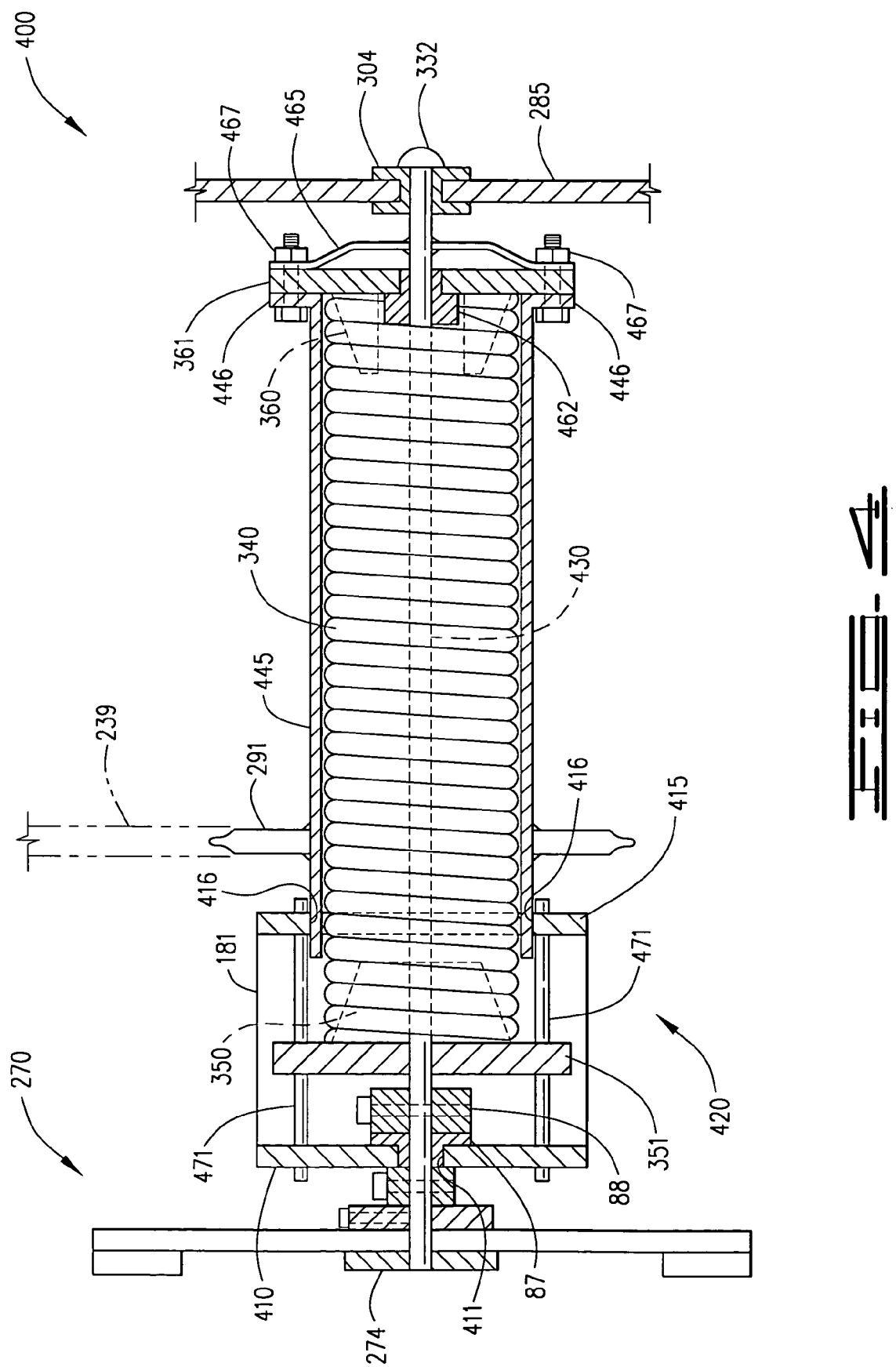
FIG. 4 is a cross-sectional drawing of another embodiment of a drive assembly, according to an embodiment of the invention.
Figure 5:
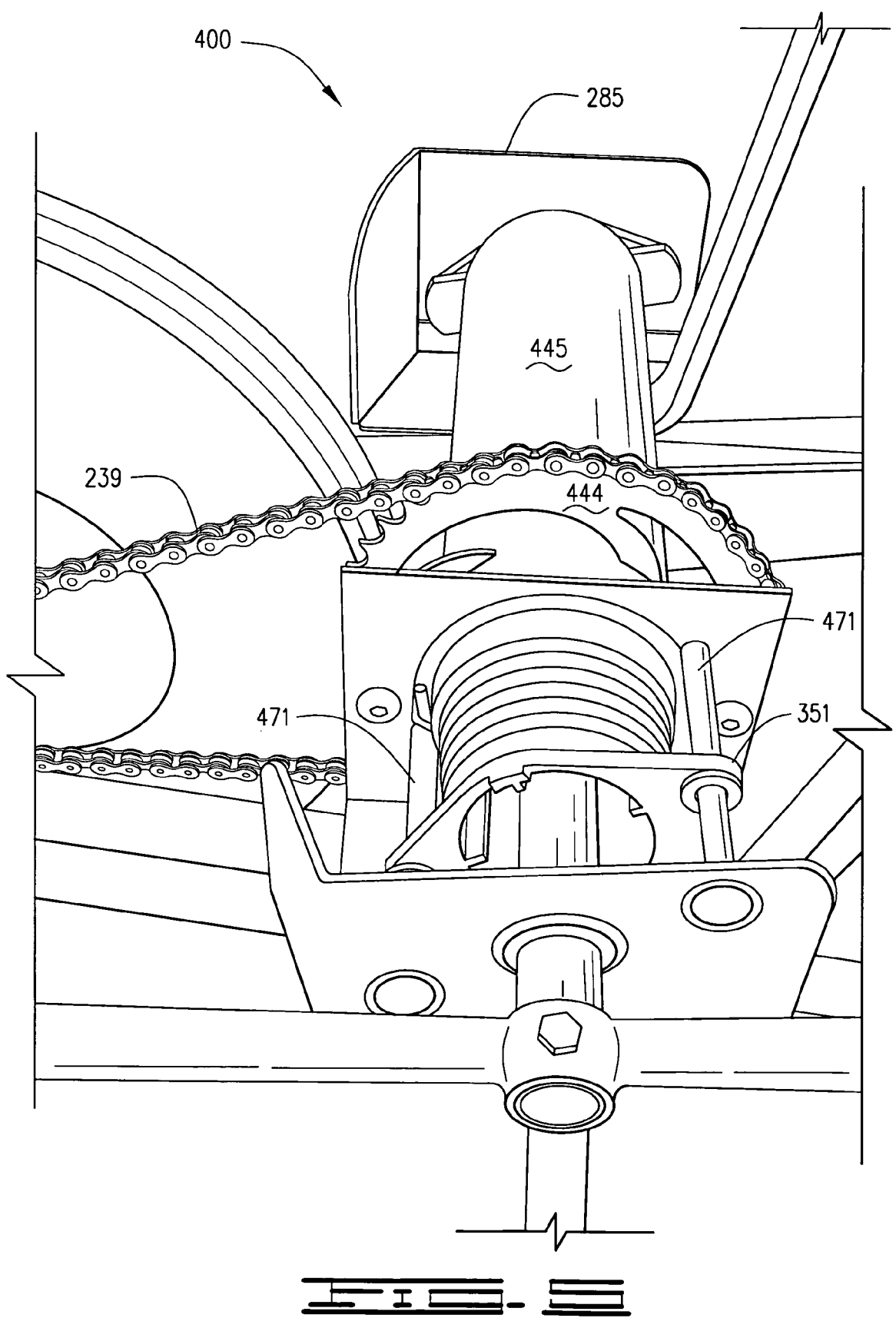
FIG. 5 is a perspective drawing of the drive assembly embodiment shown in FIG. 4, as viewed from the underside of the wheelbarrow to show details of the drive assembly embodiment, according to an embodiment of the invention.

Referring to FIGS. 4 and 5, another embodiment 400 of the drive assembly is shown, viewing the apparatus from its underside. In this embodiment 400 of the drive assembly, a single shaft 330 is used. The shaft 330 may be transversely supported by left frame plate 285 on one end and by a first wall 410 of a U-shaped enclosure 420 on the other end. Both the left frame plate 285 and the u-shaped enclosure 420 may be vertically oriented and rigidly attached by any convenient means to the underside of the frame 230 (FIG. 2).

One end of the cylinder shaft 430 may be inserted through a hole 411 in the first wall 410 of the U-shaped enclosure 420, where it may support a crank 270 attached thereto, crank 270 held in rigid connection with the cylinder shaft 430 by a collar 274. The operator may press downwardly upon a prong 272 with a foot, thus turning the crank 270 along with cylinder shaft 430 in a counterclockwise direction. Cylinder shaft 430 may be journalled through the first wall 410 of the U-shaped enclosure 420, where it may be supported for rotational movement within the wall by a bushing 287 and secured by a collar 288, which may allow the cylinder shaft 430 to rotate without sliding axially through the first wall 410. The other end of the cylinder shaft 430 may be journalled through the left frame plate 285 by two flanged bushings 304 and held in place by a bolt 332, or similar device.

As in other embodiments of the drive assembly, drive spring 340 may be provided for storage and release of rotational force. The central axis of drive spring 340 may be coaxially aligned with cylinder shaft 430, and drive spring 340 may be enclosed by cylinder 445. Each end of drive spring 340 may be frictionally engaged to tapered hubs 350, 360 so as to prevent each respective end of the drive spring 340 from rotating about its respective tapered hub 350, 360. The base 351 of hub 350 may be provided with holes on either side through which straight rails 471 are inserted. One end of each straight rail 471 may be inserted through a hole in the first wall 410 of the enclosure 420 and the other end may be welded or similarly affixed to the second wall 415 of the enclosure 420, so that the base 351 of hub 350 may freely move longitudinally along the rails 471 but is prevented from rotating by the rails 471. This may provide for changes in length of the drive spring 340 as it is tightened and released. Base 351 thus may provide a stable platform against which drive spring 340 may be tightened radially while permitting the drive spring 340 to change length longitudinally.

The opposite end of drive spring 340 may be wound by rotational action of hub 360 about spring shaft 330. Cylinder shaft 430 may pass through a hole in the base 361 of hub 360 and kept centered in the hole by a bushing 462. The base 361 may be coupled to cylinder shaft 430 by a yoke 465 that may be welded to cylinder shaft 430 and attached to base 361 by bolts 467. Alternatively, base 361 may be directly attached to cylinder shaft 430. In either event, base 361 may be associated with cylinder shaft 430 so that, when cylinder shaft 430 rotates, the base 361 rotates. A first end of cylinder 445 may also be attached to base 361 by bolts 467 inserted through mounting tabs 446 extending from the first end of cylinder 445. A second end of cylinder 445 may be inserted through an opening 416 in the second wall 415 of the enclosure 420 along with the drive spring 340, so that the second wall 415 supports the cylinder 445 for rotational movement without binding. A drive sprocket 444 may be coaxially aligned along the surface of the cylinder 445 to transfer motive force to the wheel assembly 500, as will be presently seen.

In this manner, a counterclockwise rotational action about cylinder shaft 430 (as observed from the right side of apparatus 10) may be transferred from the base 361 to hub 360, resulting in a winding action upon drive spring 340. Similarly, an unwinding action of drive spring 340 may result in a clockwise rotational movement of hub 360 and base 361, resulting in a corresponding clockwise rotational movement of drive sprocket 444.

Power from the drive spring 340 may be transferred to the drive sprocket 290, 444 and hence by drive chain 239 to the wheel assembly 500 located at the front end 214 of the apparatus 10 (FIGS. 6 and 7). Wheel 510 may rotate about an axle 540 which has been inserted through a hub extension 550 receiving a bicycle freewheel sprocket 520 tightened thereto. The hub extension 550 may be attached to the hub of the wheel 510 either permanently as, for example, by welding, braising, and the like, or removably by standard means well known in the art, such as by threading the hub extension 550 with clockwise threads, bolts, screws, set screws, and the like. The drive chain 239 may be inserted about the freewheel sprocket 520 so that when the freewheel sprocket 520 is urged into clockwise rotational movement, the power exerted by the drive chain 239 may be transferred by the freewheel sprocket 520 to the wheel 510 for forward motion of the apparatus 10. However, when the motion of drive chain 239 is reversed so that freewheel sprocket 520 is urged into counterclockwise rotation, the freewheel sprocket 520 rotates freely about its axis about axle 540. In a similar manner, if drive chain 239 is immobile and the apparatus 10 is moved in a backwards direction towards its rear end 212 so that wheel 510 rotates in a counterclockwise direction, then the freewheel sprocket 520 locks, which causes drive shaft 280 (FIG. 3) or cylinder 445 (FIG. 4) to wind the drive spring 340 in a counterclockwise motion as if crank 270 were being used to wind the drive spring 340. In other words, backing the wheelbarrow may result in a winding action for drive spring 340 and may have the same effect as winding drive spring 340 with crank 270.

It should be noted at this point that although the means for communicating the rotational force provided by embodiments of the drive assembly 276, 400 to the wheel 510 is shown as a chain, such as that normally found on a bicycle, other means may be used for this purpose without departing from the scope of the invention. For example, a rubber belt, either having ridges serving as teeth or being smooth for frictional engagement with the wheel shaft or a suitably configured hub, may be employed in this application. Other means contemplated for the invention would be, for example, a cable and pulley arrangement, a set of large gears, or direct attachment of embodiments 276, 400 of the drive assembly to the axle of wheel 510.

Figure 8:
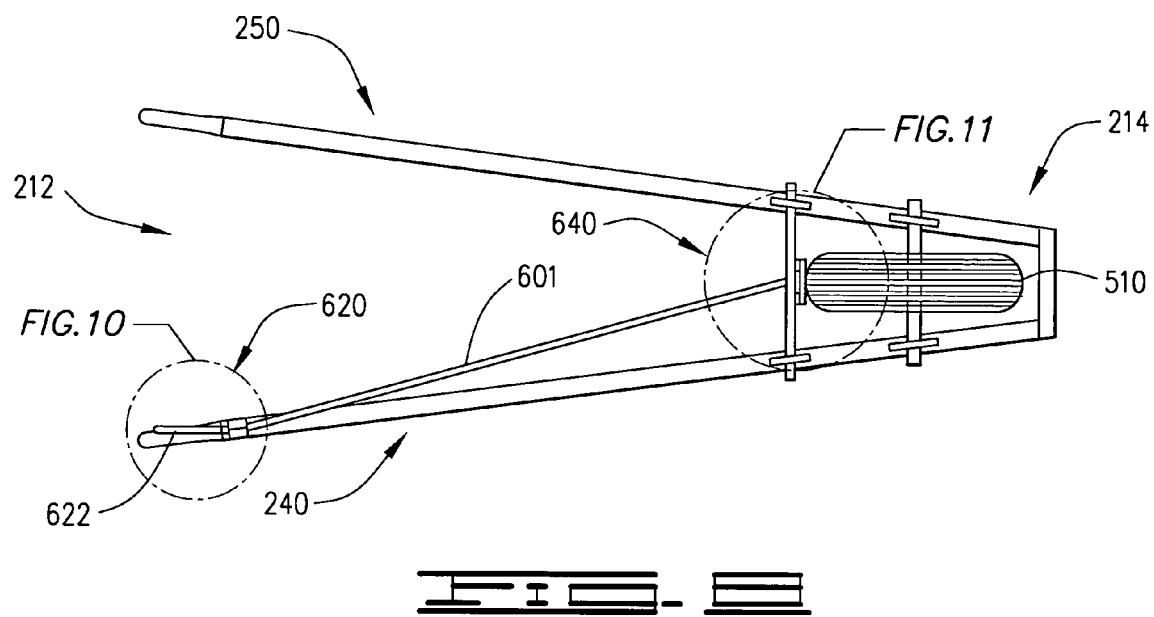
FIG. 8 is a detailed view of the braking mechanism of the apparatus as seen from the underside of the wheelbarrow looking up, according to an embodiment of the invention.
Figure 9:
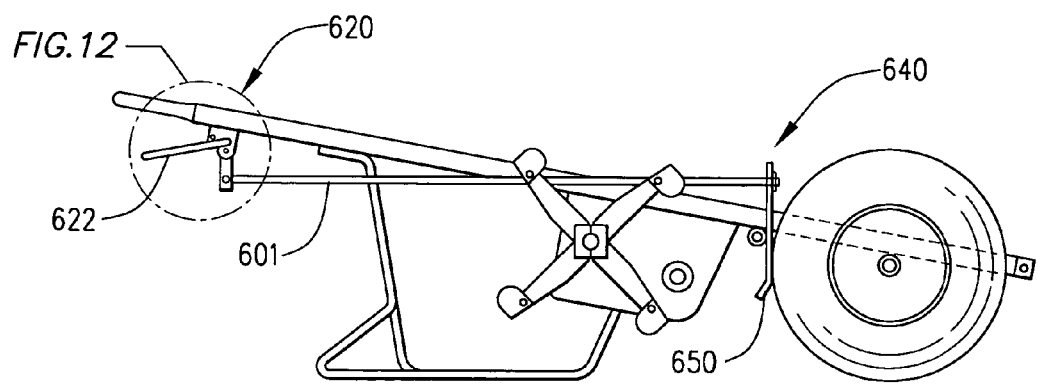
FIG. 9 is a detailed cutaway view of the braking mechanism of the apparatus with the right supporting structure removed for better visibility, according to an embodiment of the invention.
Figure 10:
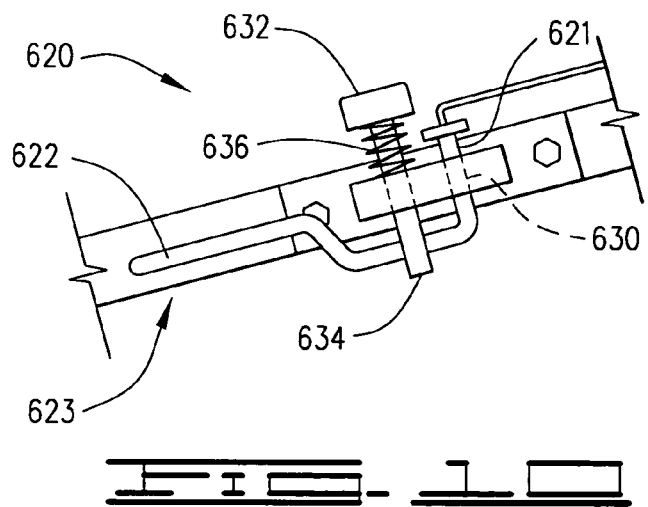
FIG. 10 is a detailed view of the brake handle assembly and locking means as seen from the underside of the apparatus, according to an embodiment of the invention.
Figure 11:
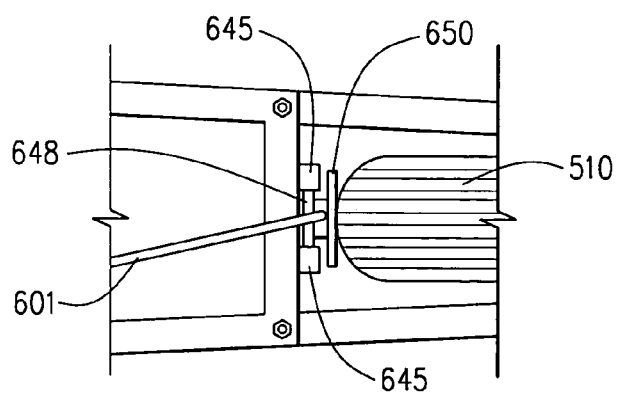
FIG. 11 is a detailed view of the braking assembly as seen from the underside of the apparatus, according to an embodiment of the invention.
Figure 12:
FIG. 12 is a side view of the handle assembly and locking means as seen from the side, according to an embodiment of the invention.

Referring now to FIGS. 8 and 9, the brake system is shown in FIG. 8 from a viewpoint under the apparatus 10 looking upwardly, and FIG. 9 shows the brake system from the right side of the apparatus 10. The brake system for apparatus 10 comprises a solid brake rod 601 extending between a brake handle assembly 620 (shown in more detail in FIGS. 5 and 7) and a braking assembly 640 (shown in more detail in FIGS. 11 and 12). Brake handle 622 may be attached to the brake handle assembly 620 for placing the brake system in an engaged position and in a disengaged position. End 623 of brake handle 622 provides a convenient gripping surface for the operator's left hand, and end 621 of brake handle 622 may be inserted through pivot hole 630 in housing 626, which serves as a pivot point for up and down movement of brake handle 622. End 621 of brake handle 622 may be fixedly attached to one end of arm 628 at roughly a 90° angle. The other end of arm 628 may be pivotably attached to an end of the brake rod 601, so that the end of brake rod 601 pivots within the hole 602 in arm 628 as it is articulated by the movement of brake handle 622.

The braking assembly 640 may support a brake shoe 650 so that it may be brought firmly in contact with wheel 510 for braking action or moved away from wheel 510 for no braking action, as required. The brake shoe 650 may be welded to a transverse brake shoe pivot rod 648 about which brake shoe 650 pivots. The ends of brake shoe pivot rod 648 may be inserted into metal bushings 645 which are welded onto a metal portion of the frame of apparatus 10 to allow brake shoe pivot rod 648 to serve as an axis of rotation. The brake shoe 650 may be articulated for movement by brake rod 601, where an end of brake rod 601 may be fixedly attached to the upper end of brake shoe 650 by any suitable means well known to those familiar with the art, e.g. insertion through a hole and engaged with a cotter pin.

In operation, the brake is engaged by upward movement by the operator on brake handle 622, causing the end of arm 628 to which the end of brake rod 601 is attached to pivot clockwise, thus pulling brake rod 601 towards the rear 212 of apparatus 10. This rearward movement is translated to the opposite end of brake rod 601 which is attached to the brake shoe 650, causing brake shoe 650 to pivot in a counterclockwise direction, bringing the lower end of brake shoe 650 into firm contact with wheel 510 to frictionally prevent its rotation. When engaging the brake, brake handle 622 may be moved above the locking pin hole 638 and the locking pin 634 may be inserted through locking pin hole 638 by pressing on knob 632, so that the brake handle 622 is captured between the locking pin 634 and the left elongate member 240. Locking pin hole 638 may be located in housing 626 so the brake handle 622 may be engaged with sufficient force so that the resilient action of wheel 510 against brake shoe 650 may provide a force tending to pull brake handle 622 downwardly against locking pin 634; this resilient action translates into a frictional pressure exerted by brake handle 622 against locking pin 634 that is greater that the force exerted by lock spring 636 against locking pin 634. When brake handle 622 is pulled upwardly further than locking pin hole 638 so that pressure against locking pin 634 is released, then lock spring 636 may pull locking pin 634 out of locking pin hole 638 to return it to an unlocked position.

The brake may be disengaged by reversing the process. If the brake is locked by locking pin 634, then brake handle 622 may be moved upwardly to release frictional pressure on locking pin 634 so that lock spring 636 urges locking pin 634 out of locking pin hole 638 to provide an unobstructed path for downward movement of brake handle 622. Then brake handle 622 may be moved downwardly, rotating counterclockwise within pivot hole 630 and simultaneously rotating arm 628 counterclockwise. This action moves brake rod 601 towards the front end 214 of the apparatus 10 to apply a forwardly directed pressure against brake shoe 650, causing brake shoe 650 to rotate clockwise about brake shoe pivot rod 648 away from wheel 510 to release frictional pressure applied by brake shoe 650 thereon. With frictional pressure from brake shoe 650 removed from wheel 510, then the force provided by embodiments 276, 400 of the drive assembly to wheel 510 by drive chain 239 may be allowed to provide a clockwise torque to wheel 510.

To operate the apparatus 10, the brake assembly 640 may be first engaged by the action of brake handle 622, described previously, to hold wheel 510 immobile through frictional force. The brake handle assembly 620 may be locked through action of locking pin 634, described previously, to maintain engagement of the brake and to allow the operator to move to the right side of apparatus 10. Using foot action, the operator then may rotate crank 270 of drive assembly 276, 400 to wind up the drive spring 340. Typically, the drive spring 340 may be of such a length that it may be completely wound four times about its shaft by approximately 16 turns of crank 270. The operator may then move back to a position between handles 241, 251 and lift the apparatus using handles 241, 251, so that supports 232, 233 are free of the horizontal surface so that the weight of the apparatus 10 and its load may be fully supported by wheel 510. Using the left hand, the operator may then lift up on brake handle 622 to release the locking action of locking pin 634 and allow the brake handle 622 to move downwardly to disengage the brake. The operator then may push the apparatus 10 in a forward direction, with the force provided by drive assembly 276, 400 being applied to the wheel 510 by drive chain 239 to assist the operator in overcoming the inertia of the apparatus 10 and its load in achieving forward movement. The force provided by drive assembly 276, 400 may be dissipated within 35 to 50 feet, but by the time the force is dissipated, the momentum of the apparatus 10 may be sufficient to allow the operator to easily continue forward movement of the apparatus 10.

As has been demonstrated, the present invention provides an advantageous apparatus and technique for assisting an operator in easily overcoming inertia of a heavily loaded wheeled apparatus so that it may be moved from place to place. While the preferred embodiments of the present invention have been described, additional variations and modifications in those embodiments may occur to those skilled in the art once they learn of the basic inventive concepts. Therefore, it is intended that the appended claims shall be construed to include both the preferred embodiment and all such variations and modifications as fall within the spirit and scope of the invention.

We claim:

1. A spring powered drive apparatus for a vehicle having at least one wheel on an axle, the apparatus comprised of
    a braking assembly for selectively preventing rotational movement of the wheel and allowing the wheel to rotate freely,
    a crank, wherein an external rotational force is applied to turn the crank;
    a freewheel sprocket coaxially mounted on the axle, the freewheel sprocket freely rotating about the axle in a first direction without communicating rotational force to the wheel and fixedly rotating with the axle in a second direction to provide torque to the wheel;
    a storage assembly for storing and releasing torque, the storage assembly comprising a helical torsion spring with a first spring end, a second spring end, and a central axis, the storage assembly further comprising a first hub disposed to restrain the first spring end from rotational movement;
    a torquing assembly receiving rotational force from the crank and applying the rotational force to the second spring end, wherein the spring stores the rotational energy;
    a releasing assembly comprising:
        a drive sprocket for transmitting rotational energy to the wheel;
        a cylinder coaxially positioned along the central axis, the cylinder enclosing the spring therein, the cylinder having a cylinder end attached to the second spring end, the drive sprocket configured for rotational movement with the cylinder about the common central axis, wherein the spring releases rotational energy causing the cylinder and drive sprocket to rotate; and
        a third power transmission means for transmitting rotational energy provided by the drive sprocket to the freewheel sprocket;
    wherein the wheel is held immobile while rotational energy is stored in the spring, and the wheel is allowed to rotate with the assistance of the rotational energy communicated by the power releasing assembly.

2. The apparatus described in claim 1, wherein the torquing assembly comprises
    a first shaft having a first shaft end and a second shaft end, the first shaft coaxially positioned along the central axis of the spring, the first shaft end affixed to the crank to receive the external rotational force exerted upon the crank; and
    a first power transmission means for applying rotational movement from the second shaft end to the second spring end.

3. The apparatus described in claim 2, wherein the first power transmission means comprises
  a second hub rigidly attached to the second shaft end and connected to the second spring end, wherein the external rotational energy is communicated from the crank along the first shaft to the second hub to cause the spring to store the rotational energy.

4. The apparatus described in claim 1, wherein the third power transmission means is selected from a group consisting of a roller chain, a belt, and a gear arrangement.

5. The apparatus described in claim 1, wherein the power storage assembly comprises
  a first shaft having a first shaft end and a second shaft end, the first shaft coaxially positioned along the central axis of the spring, the second shaft end having a spring sprocket fixedly connected to both the second spring end and the second shaft end;
  a second shaft having a third shaft end and a fourth shaft end, the third shaft end affixed to the crank to receive the external rotational force exerted upon the crank, the fourth shaft end connected to a crank sprocket, the drive sprocket connected to the second shaft between the crank and the crank sprocket; and
  a fourth power transmission means for transmitting rotational movement from the crank sprocket to the spring sprocket.

6. The apparatus described in claim 5, wherein the fourth power transmission means is selected from a group consisting of a roller chain, a belt, and a gear arrangement.

7. A manually powered vehicle comprising
  a frame;
  a wheel rotating on an axle;
  a braking assembly for selectively preventing rotational movement of the wheel and allowing the wheel to rotate freely;
  a drive assembly mounted on the frame, the drive assembly comprising
    a crank, wherein an external rotational force is applied to rotate the crank;
    a helical torsion spring supported on a spring shaft by a fixed hub at a first end of the helical torsion spring and a movable hub at a second end of the helical torsion spring, the fixed hub restraining rotational movement of the helical torsion spring and the movable hub allowing rotational movement of the helical torsion spring;
    a cylinder coaxially positioned along the central axis, the cylinder enclosing the spring therein, the cylinder having a cylinder end attached to the movable hub, wherein the spring releases rotational energy causing the cylinder to rotate;
    a first power transmission means disposed to communicate rotational force provided by movement of the crank to the movable hub in a direction that opposes the inherent resistance of the helical torsion spring to rotational movement;
    a second power transmission means disposed to communicate rotational force exerted by the cylinder to the wheel.

8. The apparatus described in claim 7, wherein the first power transmission means is selected from a group consisting of a roller chain, a belt, and a gear arrangement.

9. The apparatus described in claim 7, wherein the second power transmission means comprises a drive sprocket coaxially affixed to the cylinder for rotation about the central axis, wherein the drive sprocket transmits power to the wheel.

10. The apparatus described in claim 7, wherein the crank is operable by a foot of a person.

11. The apparatus described in claim 7, wherein the fixed hub is constrained from rotational movement by a fixed rail inserted through a base of the fixed hub, wherein the base moves longitudinally as the length of the helical torsion spring changes while resisting rotational movement of the fixed hub.

12. A manually powered vehicle comprising
  a frame;
  a wheel rotating on an axle supported by the frame;
  a crank for receiving torque exerted by a foot of a person;
  a drive assembly mounted on the frame, the drive assembly comprising
    a helical torsion spring with a central axis, a first spring end, and a second spring end, the first spring end connected to a fixed hub, the second spring end connected to a movable hub, the helical torsion spring within a coaxial cylinder having a cylinder end fixedly attached to the movable hub, wherein the fixed hub constrains the first spring end from rotational movement and the movable hub allows joint rotational movement of the second spring end and the cylinder, and wherein the cylinder freely rotates about the helical torsion spring as the movable hub rotates;
    a sprocket coaxially affixed to the surface of the cylinder;
    a shaft coaxially positioned along the central axis through the fixed hub without being affixed thereto, the shaft having a first shaft end and a second shaft end, the second shaft end fixedly attached to the movable hub, the first shaft end attached to the crank;
    a power transmission means disposed to communicate otational force exerted by the helical torsion spring on the movable hub and cylinder to the wheel.

13. The apparatus described in claim 12, wherein the power transmission means is selected from a group consisting of a roller chain, a belt, and a gear arrangement.

14. The apparatus described in claim 12, additionally comprising a freewheel sprocket coaxially mounted to the axle, the freewheel sprocket freely rotating about the axle in a first direction without communicating rotational force to the wheel and fixedly rotating with the axle in a second direction to provide torque to the wheel.

15. The apparatus described in claim 14, additionally comprising a hub extension coaxially mounted on the axle and attached to the wheel, the hub extension connecting the freewheel sprocket to the wheel.

16. The apparatus described in claim 12, wherein the fixed hub is inserted through a plurality of rails parallel with the central axis and affixed to the frame, wherein the fixed hub moves longitudinally along the rails without rotating about the central axis.

17. The apparatus described in claim 12, wherein the frame is affixed to an underside of a wheelbarrow.

18. A spring powered apparatus, comprising
  a wheelbarrow with a front end and a back end, the wheelbarrow having a frame supporting a load bearing container a distance from a horizontal surface, the frame held in spaced relationship with the horizontal surface by a support assembly positioned intermediate the front and back ends and a transversely mounted wheel positioned at the front end, the wheel having an axially mounted freewheel sprocket constrained from rotational movement in a first direction and freely rotating in a second direction, the frame having a handle at the back end for lifting the support assembly from the horizontal surface to allow the wheelbarrow to be moved on the wheel;

a crank receiving an external rotational force;

a helical torsion spring with a central axis, a first spring end, and a second spring end, the first spring end connected to a fixed hub, the second spring end connected to a movable hub, the helical torsion spring disposed within a coaxial cylinder having a cylinder end fixedly attached to the movable hub, the fixed hub constraining the first spring end from rotational movement and the movable hub allowing joint rotational movement of the second spring end and the cylinder;

a drive sprocket coaxially affixed to the surface of the cylinder;

a shaft coaxially positioned along the central axis through the fixed hub, the shaft having a first shaft end and a second shaft end, the second shaft end fixedly attached to the movable hub, the first shaft end attached to the crank; and a roller chain disposed to communicate rotational force exerted by the drive sprocket to the freewheel sprocket in the first direction.

19. The apparatus described in claim 18, further comprising a braking assembly for selectively preventing rotational movement of the wheel and allowing the wheel to rotate freely.

20. The apparatus described in claim 18, further comprising a plurality of rails affixed to the frame and disposed parallel with the central axis, the fixed hub reciprocally moving along the rails, the fixed hub constrained by the plurality of rails from rotating about the central axis.

* * * * *